United States Patent
Graybill et al.

(10) Patent No.: US 9,686,481 B1
(45) Date of Patent: Jun. 20, 2017

(54) SHIPMENT EVALUATION USING X-RAY IMAGING

(71) Applicant: Amazon Technologies, Inc., Reno, NV (US)

(72) Inventors: Jules Cook Graybill, Seattle, WA (US); James Christopher Curlander, Mercer Island, WA (US); Marshall Friend Tappen, Bainbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 455 days.

(21) Appl. No.: 14/215,697

(22) Filed: Mar. 17, 2014

(51) Int. Cl.
  *H04N 5/32*  (2006.01)
  *H04N 7/18*  (2006.01)
  *G06T 7/00*  (2017.01)

(52) U.S. Cl.
  CPC .............. *H04N 5/32* (2013.01); *G06T 7/0044* (2013.01); *H04N 7/18* (2013.01)

(58) Field of Classification Search
  CPC ........................................................ H04N 5/32
  USPC ............................................ 348/86, 91, 159
  See application file for complete search history.

(56) References Cited

U.S. PATENT DOCUMENTS

| | | | | |
|---|---|---|---|---|
| 5,524,133 A | * | 6/1996 | Neale | G01V 5/0041 250/393 |
| 8,009,949 B1 | * | 8/2011 | Peng | G02B 6/06 385/115 |
| 2004/0195320 A1 | * | 10/2004 | Ramsager | B07C 3/18 235/385 |
| 2006/0007304 A1 | * | 1/2006 | Anderson | G06K 17/0022 348/91 |
| 2010/0054545 A1 | * | 3/2010 | Elliott | A61B 5/0059 382/115 |
| 2013/0101172 A1 | * | 4/2013 | Parikh | G06T 7/0004 382/104 |
| 2015/0194132 A1 | * | 7/2015 | Ho | G09G 5/363 345/659 |

* cited by examiner

Primary Examiner — William C Vaughn, Jr.
Assistant Examiner — Joseph A Towe
(74) Attorney, Agent, or Firm — Athorus, PLLC

(57) ABSTRACT

Radiographic imaging, or X-ray imaging, may be used to identify information regarding the contents of a container or other sealed object without having to open the container or the sealed object. One or more visual analyses of radiographic images may identify items within a container, or a condition of such items, as well as the portions or amounts of the contents of the container that correspond to air or dunnage. Additionally, a radiographic image may be projected onto an external surface of a container, or rendered within an augmented reality device or wearable computer device, thereby providing information regarding the contents of the container to a worker or other personnel within a vicinity of the container.

17 Claims, 10 Drawing Sheets

US 9,686,481 B1

SHIPMENT EVALUATION USING X-RAY IMAGING

BACKGROUND

Online marketplaces typically maintain inventories of items in one or more storage or distribution facilities, which are sometimes called fulfillment centers. Such facilities may include stations for receiving shipments of items, for storing such items, and/or for preparing such items for delivery to customers. When a vendor delivers an inbound shipment of items to a fulfillment center, the items included in the inbound shipment may be removed from the container in which they arrived, and stored in one or more storage areas within the fulfillment center. Likewise, when an online marketplace receives an order for one or more items from a customer, the online marketplace may prepare an outbound shipment of the ordered items by retrieving the items from their respective storage areas within the fulfillment center, placing the items in an appropriate container with a suitable amount or type of dunnage, and delivering the container to the customer.

Many containers that arrive at a fulfillment center, or are prepared for delivery to customers from a fulfillment center, include one or more markings (e.g., numbers, sets of text or bar codes) or labels which reference or otherwise identify an order or shipment with which the containers are associated. Such markings or labels may be used to access information regarding the containers and/or their expected contents, which may be identified by resort to a registry, ledger, index or other list of information regarding the order or the shipment with which the markings or labels are associated.

Occasionally, the actual contents of a container may differ from the expected contents of the container, however. For example, a vendor may have included too few or too many items in a container of an inbound shipment, or an online marketplace may pack and ship a container associated with an outbound shipment may be prepared for delivery to a customer with too few or too many items. Similarly, a container associated with an inbound shipment or an outbound shipment may be prepared and packed with too much or too little dunnage, or with dunnage of an inappropriate type, or otherwise inappropriately positioned within the container. Shipping items in a container with too much dunnage, or with overly strong or durable dunnage, may unnecessarily increase the cost of delivering the items, while shipping items in a container with too little dunnage, or with insufficiently strong or durable dunnage, may increase the risk that such items will be damaged during transit. Once a container has been sealed, the actual contents of the container, or the conditions or locations of such contents within the container, may not be confirmed with a reasonable degree of certainty without opening the container.

Radiographic imaging, or X-ray imaging, is frequently used to identify and evaluate internal organs, bones or other matter within the human body, as well as the contents of suitcases or other luggage passing through security stations or checkpoints at airports, stadiums or other high-density facilities or other locations. One or more radiographic images, or X-ray images, of an object may be captured using traditional or digital radiographic or X-ray equipment, and information regarding the internal, hidden components of the object may be determined through one or more analyses of the captured radiographic or X-ray images.

DETAILED DESCRIPTION

As is set forth in greater detail below, the present disclosure is directed to evaluating the contents of shipments using X-ray imaging. Specifically, the systems and methods disclosed herein are directed to capturing one or more radiographic images of a container, and evaluating such images to determine information regarding the contents of a container, or the condition of such contents. The systems and methods of the present disclosure are further directed to presenting such information to a user in one or more formats or by way of one or more interfaces, and in readily available formats.

For example, when an X-ray image of a container including one or more items included therein has been captured, the X-ray image may be processed using one or more radiographic analyses to determine information regarding the contents, e.g., percentages of the internal container that constitute items or various components thereof, as well as percentages of the contents that are dunnage or air (i.e., voids), without having to open the container. The X-ray image may also be processed to determine whether any of the items included therein are damaged or missing from the container.

Additionally, an X-ray image or other radiographic image may also be projected upon one or more external surfaces of the container, as the container is either stationary or in motion, to inform workers or other personnel in a vicinity as to the contents of the container, as well as the conditions of such contents. An X-ray image of a container may be further rendered by an augmented reality device, such as a wearable optical head-mounted display, such that the X-ray image is visible on all or a portion of one or more external surfaces of the container to a user of the augmented reality device.

Figure 1A:
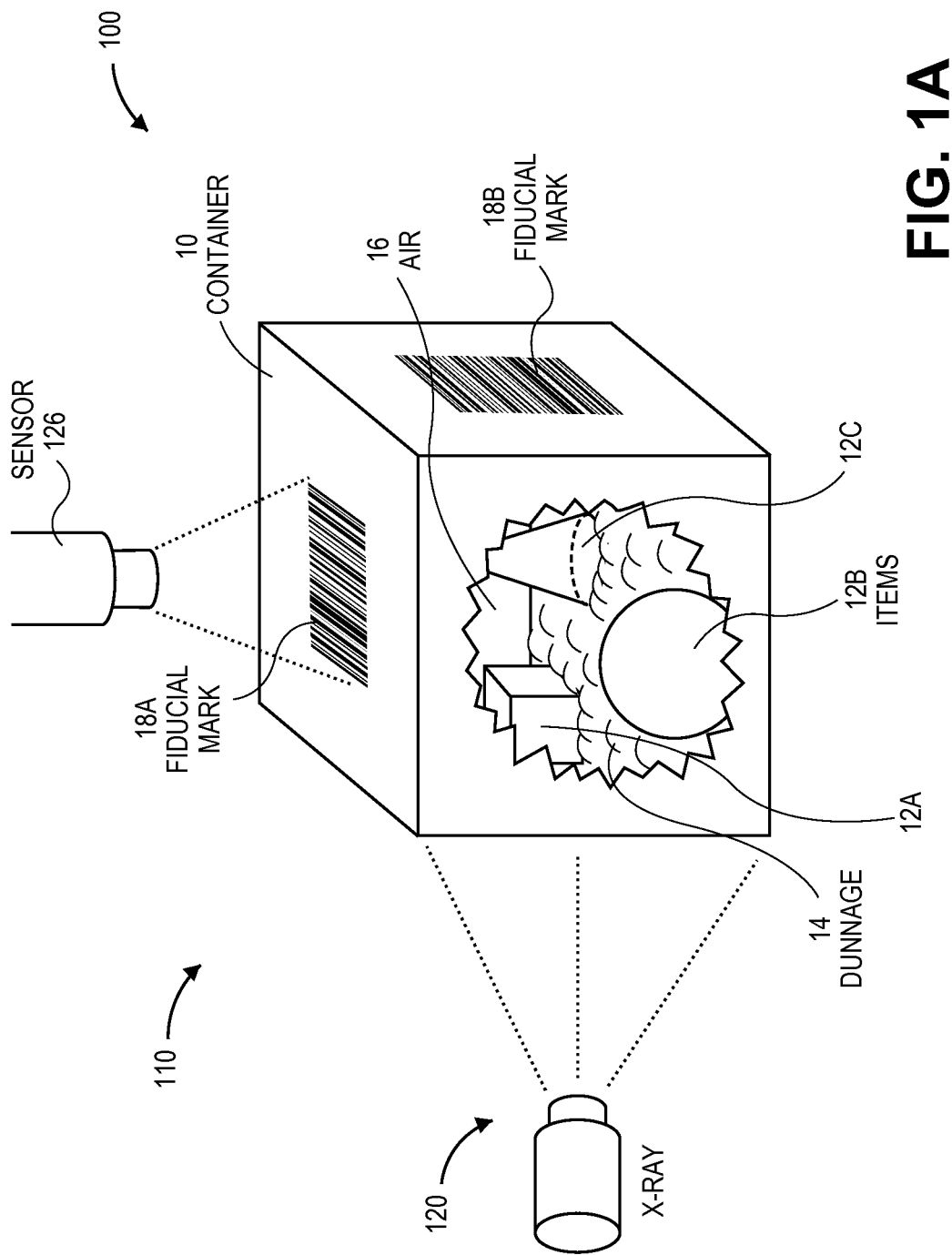
FIG. 1A is a system for evaluating shipments using X-ray imaging, in accordance with embodiments of the present disclosure.

Referring to FIG. 1A, one exemplary system 100 for evaluating the contents of shipments using X-ray imaging is shown. The system 100 includes a container 10 within a fulfillment center 110. The container 10 includes items 12A, 12B, 12C, dunnage 14 and air 16 sealed therein. Additionally, the container 10 further includes fiducial marks 18A, 18B on exterior faces thereof. The fulfillment center 110 includes an X-ray imaging scanner 120 and a sensor 126. As is shown in FIG. 1A, the X-ray scanner 120 is configured to capture one or more X-ray images of the container 10, and the sensor 126 is configured to recognize the container 10 by recognizing and evaluating the fiducial mark 18A.

Figure 1B:
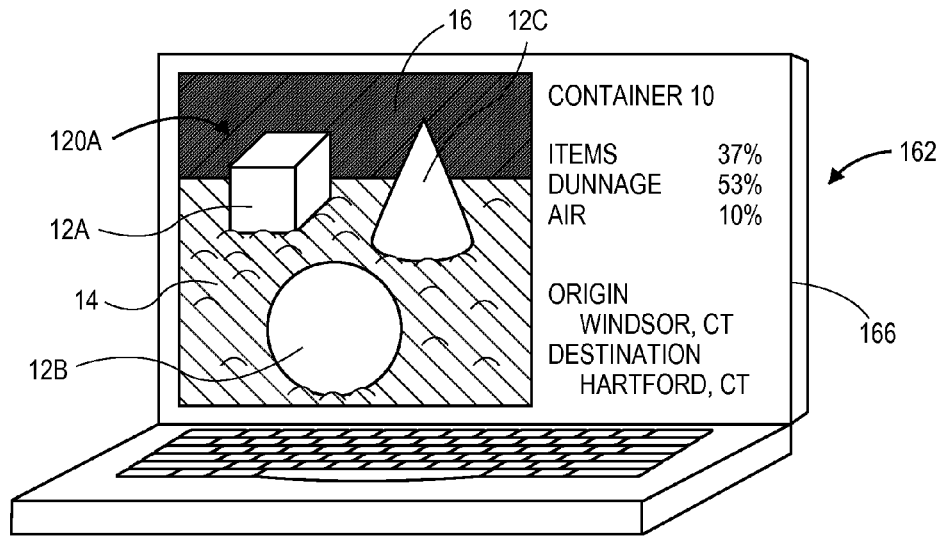
FIGS. 1B, 1C and 1D are views of components of systems for evaluating shipments using X-ray imaging, in accordance with embodiments of the present disclosure.

According to some embodiments of the present disclosure, X-ray images of the container 10 may be used to evaluate or otherwise provide information regarding the contents of the container 10 in any number of ways. For example, such images may be subjected to one or more radiographic analyses to identify the contents of the container 10, including the items actually included within the container 10 and/or the amount or extent of any dunnage or air pockets or voids within the container 10. Referring to FIG. 1B, a computer 162 is shown. The computer 162 includes a user interface 126 having an X-ray image 120A captured by the X-ray scanner 120 displayed thereon. As is shown in FIG. 1B, the user interface 126 displays the X-ray image 120A, which shows the extent of not only the items 12A, 12B, 12C but also the dunnage 14 and the air 16 included inside the container 10. The user interface 126 also includes information regarding the container 10 and its contents, which may be obtained through one or more analyses of the image 120A. Moreover, the image 120A may be readily viewed by one or more individuals, or evaluated by one or more automatic techniques, to determine a condition of the contents of the container 10, viz., whether the container 10 includes the appropriate items, or whether such items are in an adequate or salable condition.

Figure 1C:
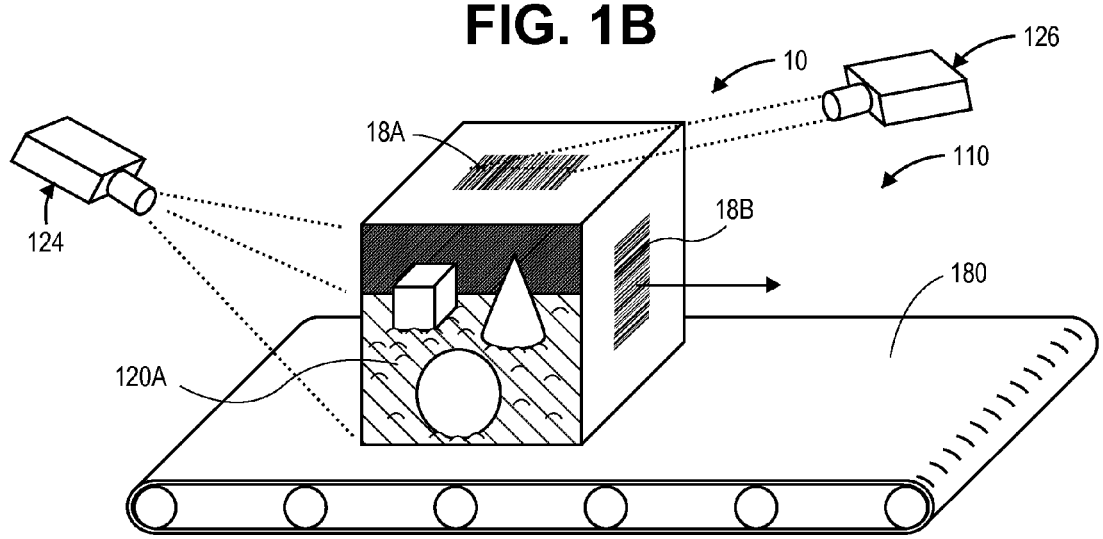

According to some other embodiments of the present disclosure, X-ray images of a container may be projected directly onto one or more surfaces of the container, thereby enabling workers or other personnel in a vicinity of the container to visually determine the contents of the container, as well as a condition of such contents, without having to open the container. Referring to FIG. 1C, a projector 124 projects the image 120A of the container 10 onto a side of the container 10, and the sensor 126 tracks the container 10 by continuing to recognize and evaluate the fiducial mark 18A, as the container 10 travels along a conveyor 180 within the fulfillment center 110, such that the projection of the image 120A remains on the side of the container 10. Thus, the contents of the container 10, viz., the items 12A, 12B, 12C, as well as the dunnage 14 and the air 16, and the condition of such contents, are readily apparent by simply viewing an exterior surface of the container 10.

Figure 1D:
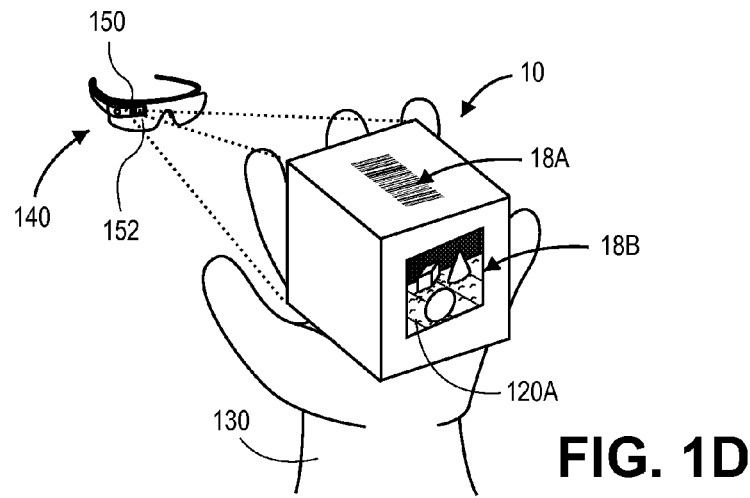

According to still other embodiments of the present disclosure, X-ray images of the container may be displayed to a user of a wearable computer device or imaging system, such as an augmented reality device having a head up display ("HUD") or other viewing component. Referring to FIG. 1D, a pair of augmented reality glasses 140 having an imaging device 150 and a sensor 152 mounted thereon may recognize the container 10, such as by scanning or reading a fiducial mark 18A, and cause the X-ray image 120A to be rendered onto or in alignment with the fiducial mark 18B to a user 130 or wearer of the glasses 140. Thus, when the user 130 of the glasses 140 views the container 10, such as while manipulating or repositioning the container 10 within his or her hands, the image 120A will appear superimposed upon the fiducial mark 18B only to the user 130, on an eye-level display of the glasses 140.

In 1895, German physicist Wilhelm Conrad Röntgen discovered that contacting electrons to an anode of a cathode ray tube resulted in a previously unidentified form of electromagnetic radiation having varying degrees of transparency through matter of different densities, and could be used to generate photographic images of internal components of the human body. Röntgen named such rays "X-rays," after the commonly accepted mathematical variable for representing the unknown, x. Today, the term "X-ray" typically refers to electromagnetic radiation having wavelengths of 0.01 to 10 nanometers (nm), frequencies of 30 petahertz (PHz, or $10^{15}$ Hz) to 30 exahertz (EHz, or $10^{18}$ Hz), and energies of 100 electron volts (eV) to 100 kiloelectron volts (keV). Since Rontgen's initial discovery, radiography, or the science of using of X-rays or electromagnetic radiation of other wavelengths, frequencies or energy levels, to evaluate matter of varying densities and compositions, has been expanded into numerous applications throughout science and technology. X-ray imagery is now routinely used by doctors and technicians in numerous medical applications, and plays a critical role in many security protocols, such as those employed at airports to determine the contents of containers, e.g., luggage, that are to be placed onto airliners.

Traditionally, X-ray images were typically formed by placing an object between an X-ray source and a radiographic film coated with an ionic emulsion, and projecting X-rays through the object and onto the film. When the exposed film was processed and developed using one or more chemical solutions, a radiographic image of the object, defined by differences in the absorptive characteristics of various components of the object, was produced. Recently, the field of digital radiography replaced the use of traditional radiographic film with one or more digital sensors that may capture X-rays passing through an object, and generate one or more digital images of the object from the captured radiation, thereby providing images more quickly and efficiently than through traditional methods while obviating the need for complex chemical processing.

Many forms of X-ray imaging techniques are now commonly used in various applications. For example, X-ray backscatter generates images of objects based on the scatter or reflection of X-rays from, rather than the absorption of X-rays by, one or more materials of such objects. In particular, the use of X-ray backscatter may result in clearer images of organic materials, which do not usually absorb much X-ray radiation. Similarly, X-ray computed tomographic techniques may now use computers to generate "slices," or parallel images of portions of a three-dimensional scanned object. Tomographic or microtomographic techniques are particularly popular in industrial applications, in which such techniques may be used to construct virtual models of objects from X-ray images.

Furthermore, modern X-ray imaging devices may also apply X-ray radiation to an object at multiple levels or frequencies, in order to determine a wider variety information regarding the specific materials of the object based on the observed responses to the different levels or frequencies of radiation. For example, information regarding a density or an atomic number of a material component may be derived based on such responses, thereby enabling operators of such devices or analysts of images generated by such devices to differentiate between different material components of the object. Similarly, multiple X-ray images of an object may be captured from different perspectives, thereby enhancing the capacity of such systems to detect components of the object within such images.

Modern X-ray applications may rely on one or more computer-based functions, methods or algorithms for the processing and analysis of X-ray images. For example, those of ordinary would recognize that low-density matter (e.g., gases), or radiolucent material, which permits all or most X-ray radiation to pass therethrough, generally appears in a dark color within an X-ray image, while high-density matter (e.g., metals), or radiopaque material, which blocks all or most of the X-ray radiation from passing therethrough, generally appears in a light color within an X-ray image. Particularly with regard to digital radiographic images, traditional analytical functions and techniques, including pattern recognition, classification, segmentation or registration techniques, may be applied and used in connection with X-ray images, typically to classify the content of such images according to data regarding colors, contrasts, areas or shapes. Some such computer-based machine-learning tools that may be used to analyze an digital X-ray image include statistical methods, artificial neural networks, K-means clustering, latent Dirichlet allocations, Bayesian classifiers, sparse dictionary learning techniques and others may be applied to X-ray images in order to detect and recognize the contents thereof, in accordance with the present disclosure.

For example, colors of pixels, or of groups of pixels, in a digital X-ray image may be determined and quantified according to one or more standards, e.g., the RGB ("red-green-blue") color model, a hexadecimal model, or according to any other model or format. Moreover, textures of features or objects expressed in a digital X-ray image may be identified using one or more computer-based visual analyses (e.g., a colorimetric analysis), algorithms or machine-learning tools, such as by identifying changes in intensities within regions or sectors of the X-ray image, or by defining areas of the X-ray image which correspond to specific surfaces. Furthermore, outlines of objects may be identified in a digital X-ray image according to any number of visual analyses, algorithms or machine-learning tools, such as by recognizing edges, contours or outlines of objects in the X-ray image, or of portions of objects, and by matching the edges, contours or outlines of the objects in the X-ray image against a database containing information regarding edges, contours or outlines of known objects. Those of ordinary skill in the pertinent arts would recognize that the systems and methods disclosed herein are not limited to any one means or method for generating X-ray images, or for gathering information from such X-ray images, in accordance with the present disclosure.

The systems and methods of the present disclosure are directed to utilizing X-ray and/or radiographic imaging to evaluate the contents of one or more containers, such as those that may be included in an inbound shipment arriving at a fulfillment center, or an outbound shipment departing from a fulfillment center, or any other kind of container. For example, the systems and methods disclosed herein may evaluate a container included in an inbound shipment in order to confirm that the contents included therein are consistent with those for which the inbound shipment is intended, without having to open the container.

Additionally, X-ray images that are captured in accordance with the present disclosure may be used to confirm the status of such contents upon their arrival, in order to assess or preclude liability if the status of such contents is not acceptable. With regard to an outbound shipment, the systems and methods of the present disclosure may be used to determine whether a container includes items that are intended for delivery but also whether the container is properly prepared and packaged for delivery, i.e., whether the container includes an appropriate amount or type of dunnage for such items, prior to departing the fulfillment center, thereby reducing or eliminating risks that inappropriate or incorrect items will be delivered, or that such items may be damaged in transit.

Those of ordinary skill in the pertinent arts will recognize that the systems and methods disclosed herein may be applied in any number of additional situations, as well. For example, according to the systems and methods of the present disclosure, an X-ray image of a portion or extension of a body may be projected onto the portion or extension of the body prior to surgery or another applicable medical procedure while the body is stationary or in transit, e.g., on a stretcher or in a wheelchair, or rendered within an eye-level display of a wearable computer apparatus. Similarly, X-ray images of suitcases or other luggage may be projected thereon or rendered within one or more eye-level displays in a security application. Furthermore, those of ordinary skill in the pertinent arts will also recognize that in addition to X-ray imaging, as well as radiographic imaging using electromagnetic radiation having wavelengths, frequencies or energy levels outside traditional X-ray bands, various other types or forms of imaging may be used to capture images of an object, including ultrasonic imaging or magnetic resonance imaging (or "MRI"), and such images may be projected upon external surfaces of the object, in accordance with the present disclosure.

Moreover, information regarding an item that may be gathered from an X-ray image of the item may be combined with any other information and utilized for any purpose. For example, where a specific container fails to include a required item, or includes too many items, the source of the container may be determined, and one or more process improvements may be implemented to correct the deficiency at the source. Similarly, where a container includes insufficient amounts or types of dunnage, or contains too much air (e.g., too many pockets or voids), the source of the container may be determined, and the deficiencies may be addressed, prior to delivering items included therein from the source to a destination, or determining whether such items arrived at the destination in a damaged or unsuitable condition. Those of ordinary skill in the pertinent arts will recognize that the number or type of applications in which information regarding the contents of a container that may be determined through the use of X-ray imaging in accordance with the present disclosure is not limited.

Figure 2:
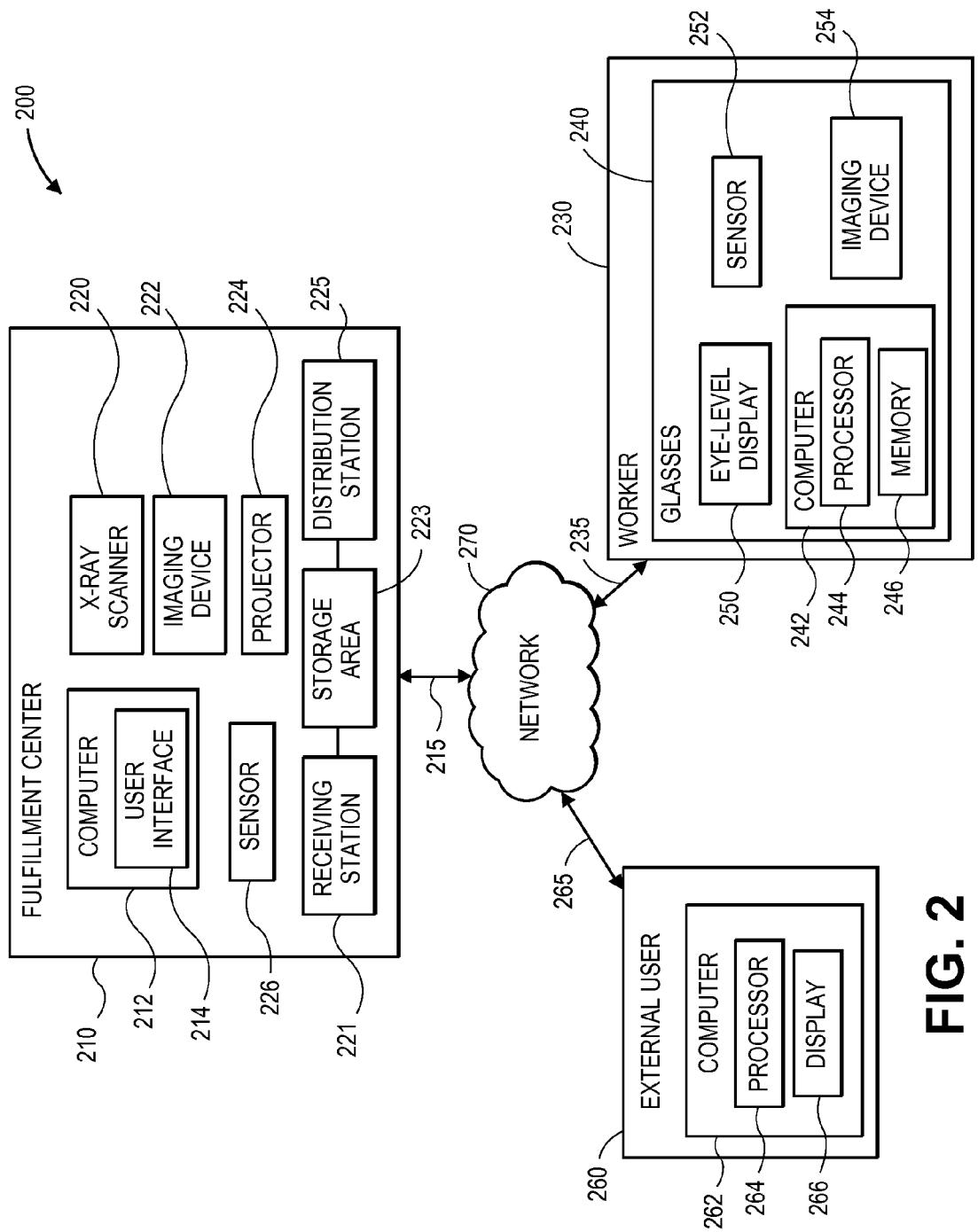
FIG. 2 is a block diagram of components of a system for evaluating shipments using X-ray imaging, in accordance with embodiments of the present disclosure.

Referring to FIG. 2, a block diagram of one system 200 for evaluating shipments using X-ray imaging is shown. The system 200 includes a fulfillment center 210, a worker 230 wearing augmented reality glasses 240 and an external user 260 that are connected to one another across a network 270, such as the Internet. Except where otherwise noted, reference numerals preceded by the number "2" in FIG. 2 indicate components or features that are similar to components or features having reference numerals preceded by the number "1" shown in FIG. 1A, 1B, 1C or 1D.

The fulfillment center 210 may be any facility that is adapted to receive, store, process and/or distribute items. Additionally, the fulfillment center 210 may operate one or more order processing and/or communication systems using a computing device such as a computer 212 and/or software applications having one or more user interfaces 214 (e.g., a browser), or through one or more other computing devices or machines that may be connected to the network 270, as is indicated by line 215, in order to transmit or receive information in the form of digital or analog data, or for any other purpose. The computer 212 may also operate or provide access to one or more reporting systems for receiving or displaying information or data regarding workflow operations, and may provide one or more interfaces, such as the user interface 214, for receiving interactions (e.g., text, numeric entries or selections) from one or more operators, users or workers in response to such information or data. The computer 212 may be a general purpose device or machine, or a dedicated device or machine that features any form of input and/or output peripherals such as scanners, readers, keyboards, keypads, touchscreens or like devices, and may further operate or provide access to one or more engines for analyzing the information or data regarding the workflow operations, or the interactions received from the one or more operators, users or workers.

As is shown in FIG. 2, the fulfillment center 210 further includes one or more X-ray scanners 220, one or more imaging devices 222, one or more projectors 224 and one or more sensors 226. The X-ray scanner 220 may be any form of X-ray device including one or more X-ray tubes or other emitting systems, or X-ray detection systems, as well as one or more control systems (not shown), which may be associated with the computer 212 or any other computer or computing device. The X-ray scanner 220 may emit one or more X-rays from various sources, e.g., from one or more anodes, and collect information regarding detected X-rays using one or more detectors. Additionally, the X-ray scanner 220 may emit electromagnetic radiation in illuminations having one or more patterns or at different frequencies, wavelengths, wave patterns or energy levels, and information regarding X-ray readings may be recorded in one or more records or data sets that may be stored in one or more data stores. Once the information has been recorded, the information may be analyzed according to one or more functions, algorithms or techniques in order to reconstruct the features of an object placed in view of the X-ray scanner 220.

The imaging device 222 may comprise any form of optical recording device that may be used to photograph or otherwise record images of items, objects, structures, facilities or other elements within the fulfillment center 210. For example, the imaging device 225 may be an optical sensor such as a digital camera that operates by electronically capturing reflected light from objects and assigning quantitative values to one or more aspects of the reflected light, such as pixels, and may incorporate a single element or a multi-element array of photodetectors such as a charge coupled device ("CCD"), a complementary metal-oxide ("CMOS") sensor, photodiodes, or the like.

The imaging device 222 may further capture information regarding any number of pixels of the reflected light corresponding to one or more base colors (e.g., red, green or blue) expressed in the reflected light, and store values associated with the pixel colors as one or more data files in a data store or transmit such values to an external computer device for further analysis or reproduction. The imaging device 222 may include one or more onboard data stores, as well as one or more removable data stores (e.g., flash memory devices), and the data files stored in the one or more data stores may be printed onto paper, displayed on one or more computer displays, such as the user interface 214 of the computer 212, the eye-level display 250 of the glasses 240, or the display 266 of the computer 262, or subjected to one or more further analyses.

According to some embodiments of the present disclosure, the imaging device 222 may include or comprise a camera or other like device that may sense not only imaging information regarding an object but also distances to the object, such as an RGB-Z image sensor. Those of ordinary skill in the pertinent arts will recognize that an RGB-Z image sensor may include arrays of pixel detectors for capturing digital imaging data including wavelengths of light within different spectral bands, such as visible light bands associated with colored RGB light, and lower frequency bands associated with infrared light. Such digital imaging data may yield information regarding a distance to an object from which such light is reflected, or an orientation or configuration of the object. The reflected light within visible RGB bands may be as outputted from the first spectral band pixel diode detector array can be coupled to an image processor, which may generate an image output that may be displayed on a computer display or outputted to a hard copy medium, and associated with an object, while the reflected light within the infrared bands may be processed in order to recognize a distance (e.g., a depth z) to the object, as well as one or more dimensions (e.g., heights or widths) of the object, and a velocity of the object.

The imaging device 222 may therefore be configured to capture one or more still or moving images, as well as any associated audio signals, or any other relevant information such as positions or velocities of objects within one or more designated locations of the fulfillment center 210. The imaging device 222 may be further adapted or otherwise configured to communicate with the computer 212, the X-ray scanner 220, the projector 224 or the sensor 226. The imaging device 222 may also be configured to communicate with the worker 230 or the external user 260, or with one or more other devices, individuals or entities (not shown) by way of the external network 270. Although the fulfillment center 210 of FIG. 2 is shown as including one imaging device 222, any number or type of imaging devices may be provided in accordance with the present disclosure, including but not limited to digital cameras or other optical sensors.

The projector 224 is configured to generate and project an image onto a surface. The projector 224 may comprise a liquid crystal display ("LCD") projector, a liquid crystal on silicon ("LCOS") projector, a digital light processing ("DLP") projector, a cathode ray tube ("CRT") projector, a laser projector, a laser scanning projector, a digital micromirror device, or other like devices for projecting one or more images. The projector 224 may be configured to generate and project full color single images, such as a digital X-ray image, or, alternatively, full motion video images.

The sensor 226 may be any form of sensing device for detecting conditions in an environment within the fulfillment center 210, and may be operatively or functionally joined with the computer 210, the X-ray scanner 220, the imaging device 222 or the projector 224 by any wired or wireless means, such as is shown in FIGS. 1A, 1B and 1C. For example, the sensor 226 may be configured to read or interpret one or more external markings on an object, such as the fiducial marks 18A, 18B on the container 10 of FIG. 1, as well as to determine a distance from between the sensor 226 and the object. Some such external markings may include images, bar codes (e.g., one-dimensional codes or two-dimensional codes, such as QR codes), bokodes, characters, numbers, symbols, or colors that are located within a specific distance or depth of field of the sensor 226. Those of ordinary skill in the pertinent arts will recognize that the number or type of sensors that may be provided in accordance with the present disclosure, including but not limited to cameras or other optical sensors, temperature sensors, heat sensors, radiation sensors or position and/or orientation sensors, is not limited. Those of ordinary skill in the pertinent arts will also recognize that the sensor 260 may also be or include a camera.

The receiving station 221 may include any apparatuses that may be required in order to receive shipments of items at the fulfillment center 210 from one or more sources and/or through one or more channels, including but not limited to docks, lifts, cranes, jacks, belts or other conveying apparatuses for obtaining items and/or shipments of items from carriers such as cars, trucks, trailers, freight cars, container ships or cargo aircraft (e.g., manned aircraft or unmanned aircraft, such as drones), and preparing such items for storage or distribution to customers. The storage area 223 may include one or more predefined two-dimensional or three-dimensional spaces for accommodating items and/or containers of such items, such as aisles, rows, bays, shelves, slots, bins, racks, tiers, bars, hooks, cubbies or other like storage means, or any other appropriate regions or stations. The distribution station 225 may include one or more regions or stations where items that have been retrieved from a designated storage area may be evaluated, prepared and packed for delivery from the fulfillment center 210 to addresses, locations or destinations specified by customers, also by way of carriers such as cars, trucks, trailers, freight cars, container ships or cargo aircraft (e.g., manned aircraft or unmanned aircraft, such as drones). Those of ordinary skill in the pertinent arts will recognize that shipments of items arriving at the receiving station 221 may be processed, and the items placed into storage within the storage areas 223 or, alternatively, transferred directly to the distribution station 225, or "cross-docked," for prompt delivery to one or more customers.

The fulfillment center 210 may further include one or more control systems that may generate instructions for conducting operations at one or more of the receiving station 221, the storage area 223 or the distribution station 225. Such control systems may be associated with the computer 212 or one or more other computing devices or machines, and may communicate with the worker 230 or the external user 260 over the network 270, as indicated by line 215, through the sending and receiving of digital data. Additionally, the fulfillment center 210 may include one or more systems or devices (not shown in FIG. 2) for determining a location of one or more elements therein, such as cameras or other image recording devices. Furthermore, the fulfillment center 210 may also include one or more workers or staff members, including but not limited to the worker 230 or the external user 260, who may handle or transport items within the fulfillment center 210. Such workers may operate one or more computing devices or machines for registering the receipt, retrieval, transportation or storage of items within the fulfillment center, such as the computer 212, or a general purpose device such a personal digital assistant, a digital media player, a smartphone, a tablet computer, a desktop computer or a laptop computer, and may include any form of input and/or output peripherals such as scanners, readers, keyboards, keypads, touchscreens or like devices.

As is shown in FIG. 2, the worker 230 may wear or otherwise manipulate a pair of augmented reality glasses 240 including a computer device 242, an eye-level display 250, a sensor 252 and an imaging device 254. The computing device 242 includes a processor 244 and a memory 246, and may be in communication with the fulfillment center 210, the external user 260 or other external components via the network 270, as indicated by line 235, through the sending and receiving of digital data. The memory 246 may contain computer program instructions that the processor 244 may execute in order to implement one or more embodiments of the present disclosure, and may further include random access memory ("RAM"), read-only memory ("ROM") or any other form of persistent and/or non-transitory computer-readable media. The memory 246 may further store an operating system thereon, for the purpose of providing general administration and operation functions for the processor 244 and other components of the glasses 240, as well as other information for implementing any aspects of the present disclosure.

The eye-level display 250 may include any type or form of output device that may be positioned at or near an eye-level of the worker 230 wearing the glasses 240. The eye-level display 250 may thus include a display device that is mounted or visible within a field of view of the user, including but not limited to a sufficiently small monitor or a head-up display projected upon a lens of the glasses 240. For example, the eye-level display 250 may incorporate any of a number of active or passive display technologies, such as electronic ink, liquid crystal display (or "LCD"), LED or organic light-emitting diode (or "OLED") displays, cathode ray tubes (or "CRT"), projection screens or the like. Those of ordinary skill in the pertinent arts would further realize that any other form of output device may be associated with the eye-level display 250, or may act as a substitute for the eye-level display 250.

The sensor 252 may be any form of sensing device for detecting conditions in an environment in which the glasses 240 are situated, and may be operatively or functionally joined with the imaging device 254 by any wired or wireless means. Any number or type of sensor may be provided in accordance with the present disclosure, including but not limited to cameras or other optical sensors, bar code readers, temperature sensors, heat sensors, radiation sensors or position and/or orientation sensors. Those of ordinary skill in the pertinent arts will recognize that the glasses 240 may include any number of sensors 252.

The imaging device 254 may be any form of optical recording device mounted to or otherwise associated with the glasses 210, e.g., a digital camera that may be mounted to a frame of the glasses 240. For example, the imaging device 254 may be used to photograph or otherwise capture and record images of the structures, facilities or other elements for storing items inside the fulfillment center 250, as well as the items within the fulfillment center 250, or for any other purpose.

The external user 260 may be any entity or individual, other than the worker 230, that utilizes one or more computing devices, such as the computer 262 or any other like machine having one or more processors 264 and computer displays 266. The computer 262 may be connected to or otherwise communicate with the worker 230 and/or the glasses 240 or the fulfillment center 210 through the network 270, as indicated by line 265, by the transmission and receipt of digital data. For example, the external user 260 may review X-ray images captured by the X-ray scanner 220, images or other information captured by the imaging device 222, or information gathered by the sensor 226. The external user 260 may also use the computer 262 to provide one or more commands or instructions to the projector 224, or to process images or other information captured by the X-ray scanner 220, the imaging device 222, the sensor 226, or any other computer component (not shown). The computer 262 may, like the computer 212, may be a general purpose device or machine, or a dedicated computing device or machine that features any form of input and/or output peripherals such as scanners, readers, keyboards, keypads, touchscreens or like devices.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent arts will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

Those of ordinary skill in the pertinent arts will understand that process steps described herein as being performed by a "worker," "glasses," a "fulfillment center," or an "external user," or like terms, may be automated steps performed by their respective computer systems, or implemented within software modules (or computer programs) executed by one or more general purpose computers. Moreover, process steps described as being performed by a "worker," "glasses," a "fulfillment center," or an "external user" may be typically performed by a human operator, but could, alternatively, be performed by an automated agent.

The fulfillment center 210, the worker 230, the glasses 240 and/or the external user 260 may use any web-enabled or Internet applications or features, or any other client-server applications or features including electronic mail (or E-mail), or other messaging techniques, to connect to the network 270 or to communicate with one another, such as through short or multimedia messaging service (SMS or MMS) text messages. For example, the glasses 240 or the glasses computer 242 may be adapted to transmit information or data in the form of synchronous or asynchronous messages to the fulfillment center 210 and/or the fulfillment center computer 212, the external user 260 and/or the external user computer 262 or any other computer device in real time or in near-real time, or in one or more offline processes, via the network 270. Those of ordinary skill in the pertinent arts would recognize that the fulfillment center 210, the worker 230, the glasses 240 and/or the external user 260 may operate any of a number of computing devices that are capable of communicating over the network, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers, such as the fulfillment center computer 212, the glasses computer 242, or the external user computer 262, or any other computers or control systems utilized by the fulfillment center 210, the worker 230 and/or the external user 260 and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3:
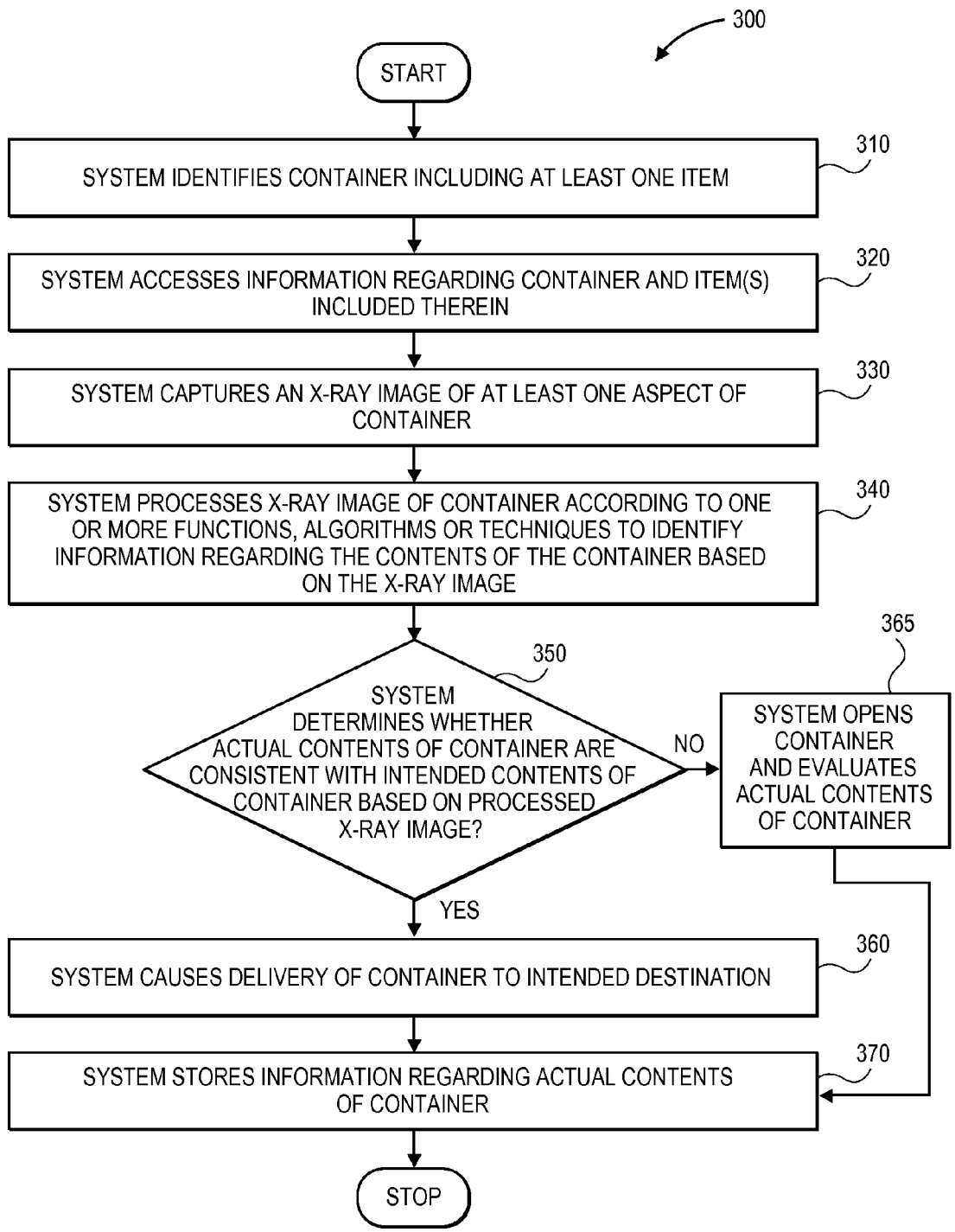
FIG. 3 is a flow chart of one process for evaluating shipments using X-ray imaging, in accordance with embodiments of the present disclosure.

As is discussed above, the contents of a sealed container may be evaluated by capturing one or more X-ray images of the container, and performing one or more radiographic analyses on the captured images to determine the amount, share or portion of the contents thereof which include items, dunnage and/or air, as well as the condition of such contents. Referring to FIG. 3, a flow chart 300 representing one embodiment of a process for evaluating shipments using X-ray imaging is shown. At box 310, a system identifies a container including at least one item therein. For example, the container may be recognized by scanning one or more specific identifiers, labels or markings such as bar codes (e.g., both one-dimensional codes and two-dimensional codes), bokodes, characters, numbers, symbols, or colors, or a fiducial mark, pattern or image on an external surface of the container, which may then be evaluated and associated with the container. The container may be included as a part of an inbound shipment arriving at a fulfillment center, or an outbound shipment departing from the fulfillment center, or may be any other type or kind of container utilized in any other environment.

At box 320, the system accesses information regarding the container and the one or more items included therein. For example, where the container has been identified based on a scanning or reading of an external identifier, label or marking (e.g., a bar code, a set of text or one or more numbers applied thereon), information associated with the container may be identified or accessed. For example, a variety of information regarding the container may be identified by resort to a registry or ledger, including information regarding a source of the container (e.g., a merchant or vendor from which the container originated) or a destination for the container (e.g., a customer or location to which the container is to be delivered), information regarding the intended contents of the container (e.g., a number, mass or volume of the items included therein, or whether the container includes any materials requiring specific handling procedures such as hazardous materials, fragile items or flammable liquids or gases), as well as information regarding a value of such contents (e.g., a cost of the items included therein, as well as the names of any parties responsible for their safe transportation from the source to the destination, or any applicable insurance policies).

At box 330, the system captures at least one X-ray image of one or more aspects of the container. For example, the system may provide a single X-ray scanner, such as the X-ray scanner 120 of FIG. 1A, that is configured to capture X-ray images of the container with respect to one or more orthogonal axes (viz., x-, y- or z-axes). Alternatively, the system may provide multiple X-ray scanners in different axes orientations. Additionally, the capturing of X-ray images may be controlled or customized based on the known or anticipated contents of the container, in order to optimize or enhance the quality of the X-ray images. For example, where a container is expected to include a single item of a substantially uniform shape and volume, one X-ray image of the container captured from a single perspective may suffice. Where the container is expected to include multiple items of varying shapes or volumes, or where the contents of the container are not known to a reasonable degree of certainty, multiple X-ray images from different perspectives may be desired. Finally, the energy levels or frequencies of the X-ray radiation applied to the container may be varied as necessary to produce X-ray images having different properties, qualities or resolutions with regard to the contents of the container.

At box 340, the system processes the X-ray images according to one or more functions, algorithms or techniques in order to identify information regarding the contents of the container represented therein. For example, the images may be classified according to feature detection, K-means clustering or vector quantization methods from a single view, or from multiple views, and at respective energy levels, in order to recognize one or more edges, outlines or contours within the X-ray images. Additionally, as is also discussed above, the colors (e.g., the brightness or darkness) of objects expressed within an X-ray image is a function of the relative radiolucence and/or radiopacity of the objects, which is typically a function of the densities of the objects. Therefore, one or more colorimetric or other visual analyses of the X-ray images may be performed in order to recognize the portions of the image that correspond to items, as well as the portions of the image that correspond to dunnage or air. Furthermore, the system may determine a number of items, the orientations of such items, as well as a condition of the items within the container, as well as an estimated amount of dunnage and/or air within the container based on an analysis of the X-ray images.

At box 350, the system determines whether the actual contents of the container are consistent with the intended contents of the container based on the processed X-ray images. For example, some of the information regarding the container that is accessed at box 320 may include an intended number, size and orientation of items within the container, as well as an intended amount or density of dunnage, and an acceptable level of air within the container. Therefore, the system may compare information regarding the contents of the container as determined from the processed X-ray image at box 340 with the information regarding the container that is accessed at box 320, in order to determine whether the intended contents of the container are consistent with the intended contents of the container. Similarly, the system may also determine whether the contents are properly oriented within the container, and in an acceptable condition within the container, based on the processed X-ray images.

If the actual contents of the container are consistent with the intended contents of the container, then the process advances to box 360, where the container is delivered to its intended destination. For example, where the container is an inbound shipment of items that has arrived at a receiving station, such as the receiving station 221 of FIG. 2, the container may be processed for storage within a storage area or cross-docked to a distribution station, such as the storage area 223 or the distribution station 225 of FIG. 2, for delivery to one or more customers if the actual contents of the container are consistent with what was intended for the container. Where the container is an outbound shipment of items intended for delivery to a customer, the container may be processed for delivery to the customer directly if the actual contents are consistent with what was intended for the container. If the actual contents of the container are not consistent with the intended contents, however, then the process advances to box 365, where the container is subject to further evaluation and analysis. For example, the container may be opened and the actual contents thereof, and their respective conditions, may be visually inspected, and any damaged or missing items may be identified.

At box 370, information regarding the actual contents of the container may be stored in at least one data store. Such information may include the one or more X-ray images of the container, and may also, for example, refer to a source of the container, a destination of the container, an order with which the container is associated, as well as the number, orientation or condition of the items included in the container. Additionally, such information may be used for any further purpose, including to generate one or more statistical analyses of the efficacy of preparing and delivering items, or to identify effective or ineffective shipment preparation procedures or materials.

Accordingly, the systems and methods may use X-ray imaging of a sealed container to determine information regarding the actual contents of the container, such as the number, type or condition of items that are included therein, without having to open the container. Such systems and methods may generate X-ray images, and analyze such images in order to identify any type or form of information or data regarding the container or the contents therefrom. The information or data that may be obtained through such analyses may be used for any purpose.

Figure 4:
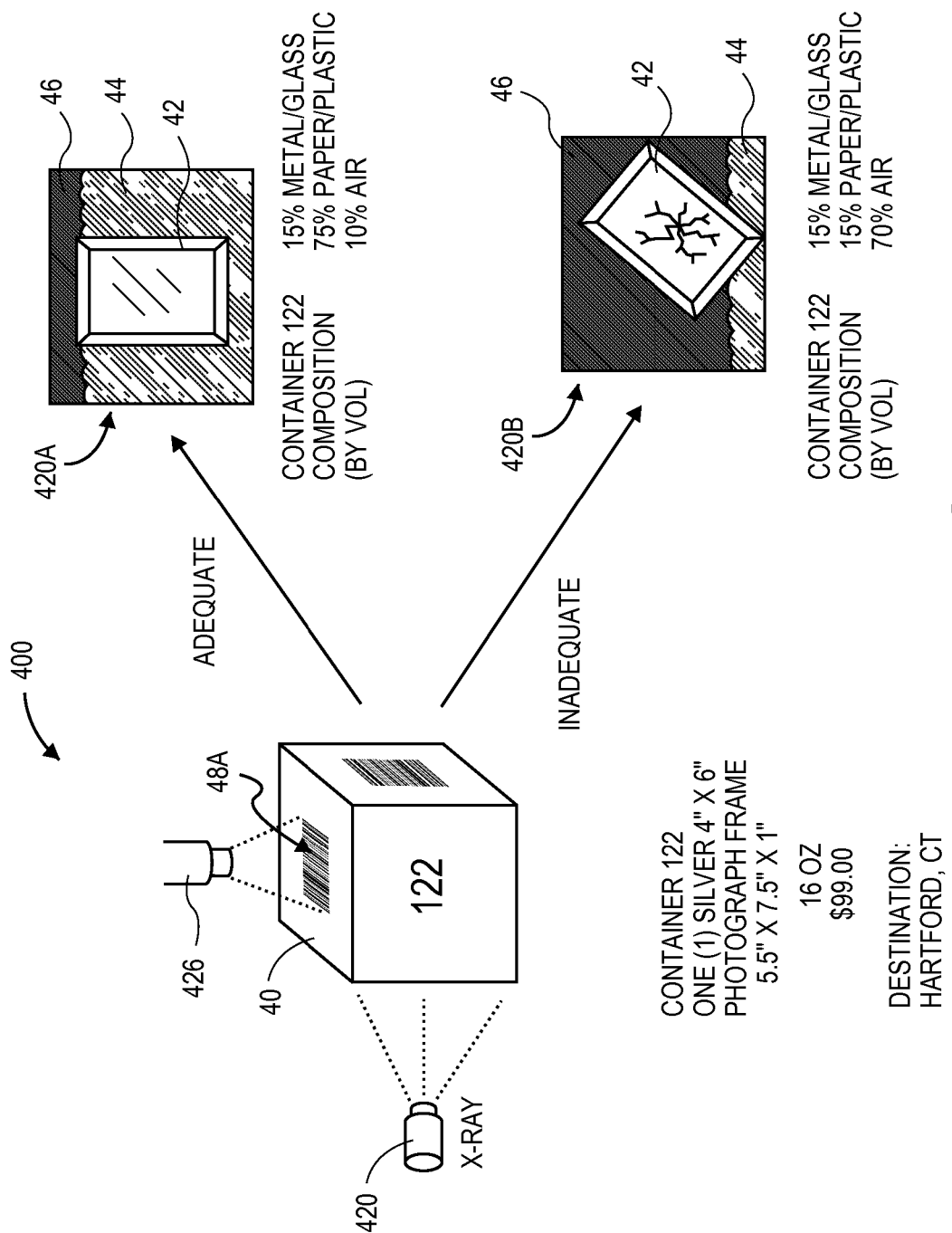
FIG. 4 shows components of one system for evaluating shipments using X-ray imaging, in accordance with embodiments of the present disclosure.

Referring to FIG. 4, components of one system 400 for evaluating shipments using X-ray imaging are shown. Except where otherwise noted, reference numerals preceded by the number "4" in FIG. 4 indicate components or features that are similar to components or features having reference numerals preceded by the number "2" shown in FIG. 2, or to components or features having reference numerals preceded by the number "1" shown in FIG. 1.

As is shown in FIG. 4, the system 400 includes an X-ray scanner 420 configured to capture one or more X-ray images 420A, 420B of a container 40 (viz., Container 122), and a sensor 426 configured to recognize one or more markings 48A (viz., a bar code) on an external surface of the container 40. Once the X-ray images 420A, 420B have been captured, such images 420A, 420B may be stored in at least one data store and subjected to one or more forms of analysis in order to radiographically determine the condition or composition of contents of the container 40, or for any other purpose.

As is discussed above, various materials may have differing levels of radiopacity or radiolucence based at least in part on their respective densities, and may therefore appear differently in an X-ray image captured thereof. For example, the image 420A, which shows an item 42 (viz., a silver photograph frame) adequately packed within the container 40, may identify specific regions corresponding to the item 42 within the container 40, as well as dunnage 44 and air 46 or voids therein. As is shown in the image 420A of FIG. 4, the item 42, the dunnage 44 and the air 46 are shown in different colors, including dark colored areas corresponding to low density matter (e.g., the air 46 or the dunnage 44) and light colored areas corresponding to denser metallic matter (e.g., the item 42). Similarly, the image 420B, which shows the item 42 inadequately packed within the container 40, also identifies specific areas or regions corresponding to components of the item 42, the dunnage 44 and the air 46 or voids therein.

As is also discussed above, a variety of information regarding a container and its contents may be obtained through an analysis of X-ray images, such as the images 420A, 420B of FIG. 4. For example, a radiographic analysis of the respective images may provide information regarding the amount or extent of the container that includes or corresponds to items, dunnage or air. As is shown in FIG. 4, a radiographic analysis of the image 420A may determine that fifteen percent (15%) of the volume of the container 40 constitutes metal or glass, i.e., components of the item 42, and also that seventy-five percent (75%) of the volume of the container 40 constitutes dunnage 44, while ten percent (10%) of the volume of the container 40 constitutes dunnage 44. If the portions of the volume of the container 40 which correspond to components of the item 42, dunnage 44 or air 46 are satisfactory or otherwise within predetermined limits or thresholds, the container 40 may be deemed adequately packed and prepared for delivery. Conversely, as is also shown in FIG. 4, a radiographic analysis of the image 420B may determine that fifteen percent (15%) of the volume of the container 40 constitutes metal or glass, that fifteen percent (15%) of the volume of the container 40 constitutes dunnage 44, and that seventy percent (70%) of the volume of the container 40 constitutes dunnage 44. If such portions of the volume of the container are unsatisfactory or in violation of predetermined limits or thresholds, the container 40 may be deemed adequately packed or prepared for delivery.

Additional information may be determined from a visual evaluation of X-ray images of a container, such as the images 420A, 420B of the container 40 shown in FIG. 4. For example, as is shown in the image 420A, the item 42 is in a visibly suitable condition and is positioned within the container 40 in an appropriate orientation. Conversely, as is shown in the image 420B, the item 42 is visibly damaged, and is positioned within the container 40 in an inappropriate orientation.

Figure 5:
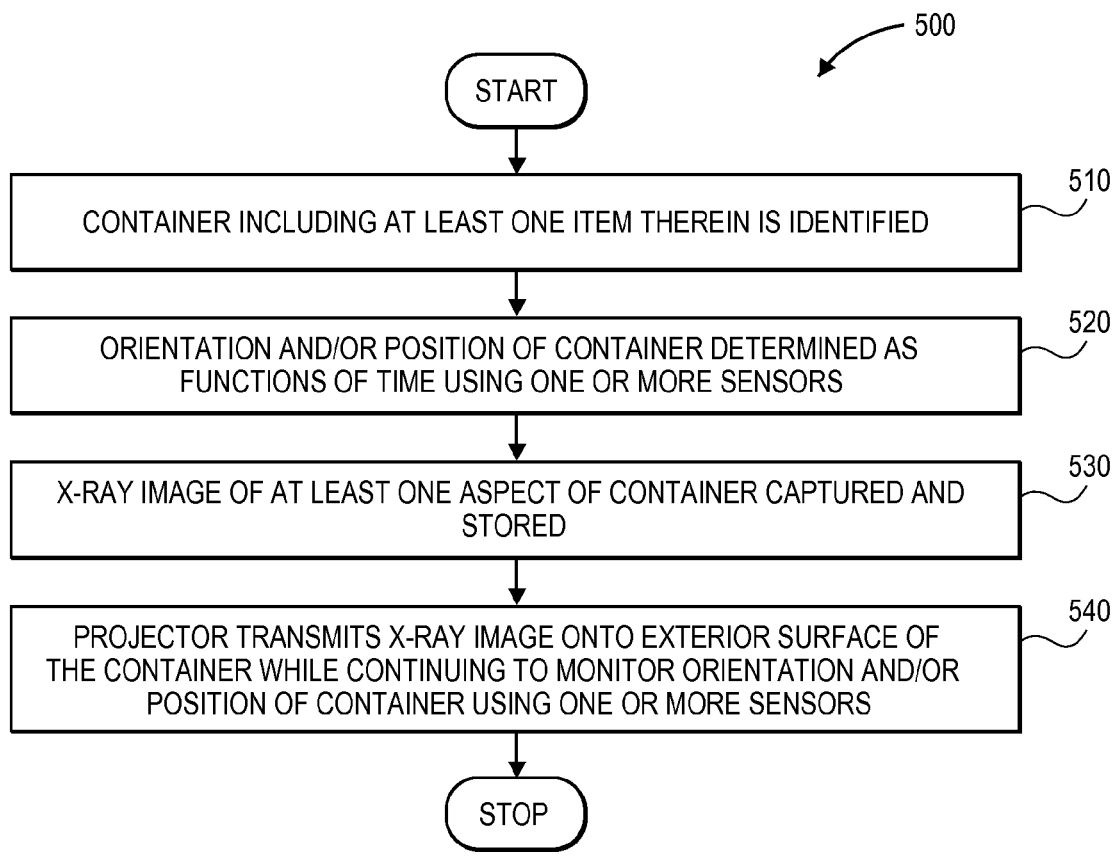
FIG. 5 is a flow chart of one process for evaluating shipments using X-ray imaging, in accordance with embodiments of the present disclosure.

As is also discussed above, an X-ray image of the contents of a container may be projected onto one or more external surfaces of the container, thereby enabling workers or other personnel in the vicinity of the container to determine what is included inside the container without having to open it. Referring to FIG. 5, a flow chart 500 representing one embodiment of a process for evaluating shipments using X-ray imaging is shown. At box 510, a system identifies a container including at least one item therein. As is discussed above with regard to the process shown in the flow chart 300 of FIG. 3, the container may be recognized or identified by scanning one or more specific identifiers, labels or markings such as bar codes (e.g., a one-dimensional code or a two-dimensional code, such as a QR code), bokodes, characters, numbers, symbols, or colors, or a fiducial mark, pattern or image on an external surface of the container, such as by scanning the fiducial mark 18A of the container 10 using the scanner 126 of FIG. 1A. The container may be provided as a part of an inbound shipment or an outbound shipment arriving at or departing from a fulfillment center, or in any other environment.

At box 520, one or more sensors detect an orientation and position of the container as a function of time. For example, where the container is placed on a moving conveyor system such as a conveyor belt, a sensor such as an RGB-Z image sensor or other motion controller may capture digital imaging data or other information regarding a location of the container, as well as an orientation (e.g., alignment or configuration) of the container, on the conveyor system at one or more discrete times. Such information may be determined using one or more infrared, laser or other automatic range-finding (e.g., "time of flight") system and extrapolated over time. Additionally, one or more elements of the orientation or position of the item may be fixed or variable over time, i.e., the item may be fixed in position and may rotate about one or more axes, or may be secured from rotating but may be in linear motion.

At box 530, X-ray images of one or more aspects of the container may be captured and stored in at least one data store. For example, using one or more X-ray scanners, such as the X-ray scanner 120 of FIG. 1A, which may be configured in one or more orientations, X-ray images of the container may be captured using X-ray radiation at any number of energy levels or frequencies, and such images may be stored in at least one database or other memory device. Such scanners may be oriented in any configuration, i.e., with respect to one or more orthogonal axes (viz., x-, y- or z-axes), and may be operated or controlled based on the known or anticipated information regarding the container, in order to optimize or enhance the quality of the resulting X-ray images.

At box 540, a projector transmits one or more of the X-ray images captured at box 530 onto an exterior surface of the container in accordance with the orientation and position of the container while continuing to monitor the orientation and/or the position of the container using one or more sensors. For example, the X-ray images may be transmitted from projector onto an external face or aspect of the container, such as the projector 124 and container 10 of FIG. 1C, based at least in part on the orientation and position of the container determined as functions of time at box 520, while recognizing and evaluating the fiducial mark 18A on the container 10, as is shown in FIG. 1C.

Accordingly, by projecting one or more X-ray images of a container onto an exterior surface of the container, the systems and methods of the present disclosure may convey information regarding the contents of the container to one or more workers or other personnel in a vicinity of the container. Such systems and methods provide a number of advantages over the prior art, including the capacity to quickly and easily evaluate contents of a container, and the condition of such contents, without having to open the container.

Figure 6:
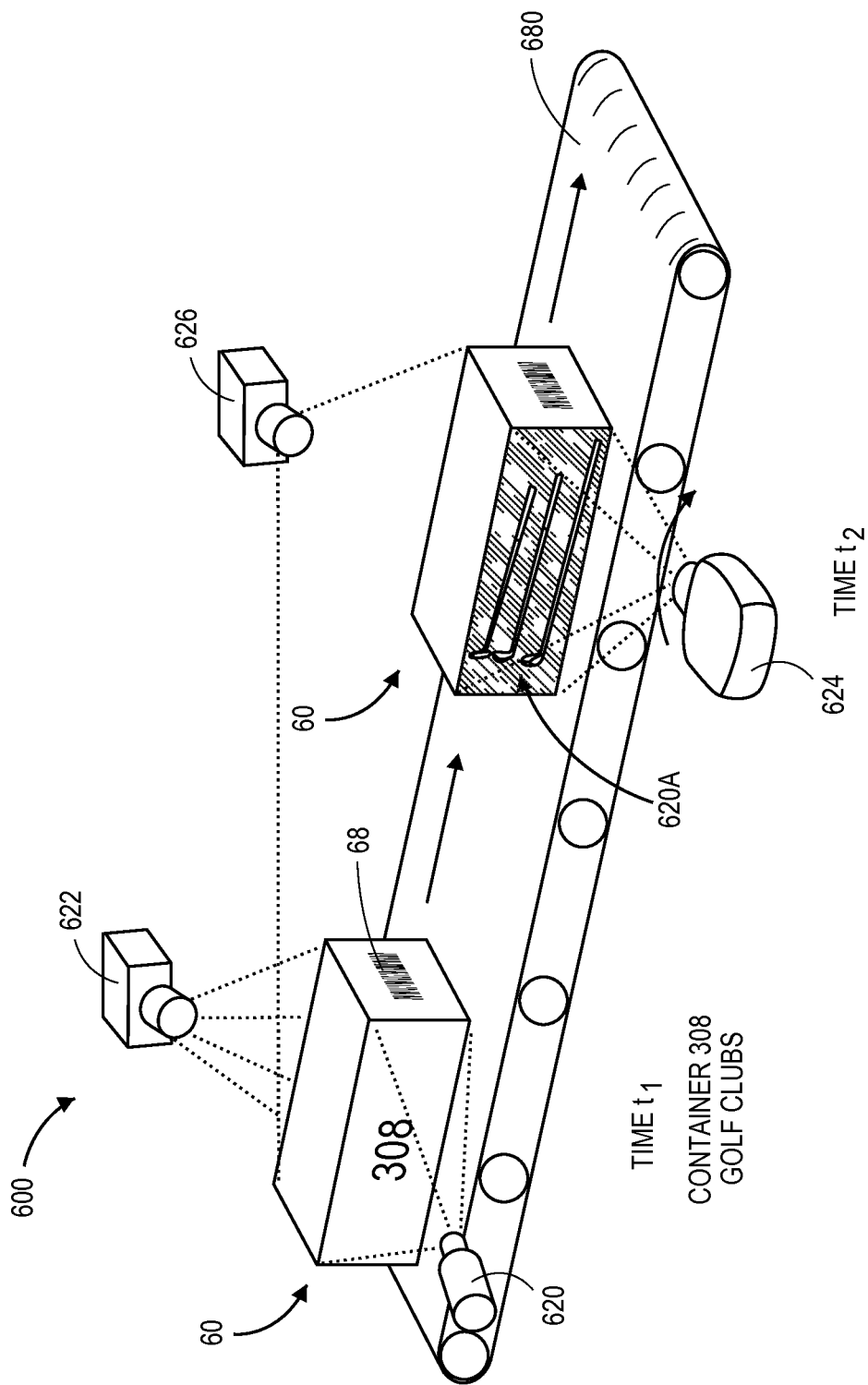
FIG. 6 shows components of one system for evaluating shipments using X-ray imaging, in accordance with embodiments of the present disclosure.

Referring to FIG. 6, components of one system 600 for evaluating shipments using X-ray imaging are shown. Except where otherwise noted, reference numerals preceded by the number "6" in FIG. 6 indicate components or features that are similar to components or features having reference numerals preceded by the number "4" shown in FIG. 4, to components or features having reference numerals preceded by the number "2" shown in FIG. 2, or to components or features having reference numerals preceded by the number "1" shown in FIG. 1.

As is shown in FIG. 6, the system 600 includes an X-ray scanner 620, an imaging device 622, a projector 624 and a sensor 626. The X-ray scanner 620 may be configured to capture one or more X-ray images 620A of a container 60 (viz., Container 308) on a conveyor 680. The imaging device 622 may be configured to capture one or more photographic images of the container 60, and to sense or determine information regarding an orientation or position of the container 60 on the conveyor 68 as a function of time (i.e., a velocity of the container 60). The projector 624 may be configured to project one or more images onto an exterior surface of the container 60, and the sensor 626 may be configured to recognize one or more markings 68 (viz., a bar code) on an external surface of the container 60 as the container travels along the conveyor 680.

The systems and methods of the present disclosure, such as the system 600 of FIG. 6, may be used to provide information regarding contents of a container directly onto a surface of the container. For example, the sensor 626 may recognize the container 60, and an X-ray image 620A of the container 60 may be captured, associated with the container 60 and stored in at least one data store. The imaging device 622 may record information regarding the container 60 that may be used to determine an angular and/or linear velocity of the container 60. The projector 624 may be configured to cause the image 620A to be projected onto one or more exterior surfaces of the container 60 as the container 60 travels along the conveyor 680 based at least in part on the angular and/or linear velocity of the container 60 as determined using information captured by the imaging device 622. Accordingly, workers or other personnel in a vicinity of the container may visually identify the contents of the container 60, and determine whether the appropriate items are included in the container 60, or whether the items are properly packaged within the container 60, without having to open and visually examine the contents of the container 60.

Moreover, according to some embodiments, the image 620A may be projected onto a surface of the container 60 corresponding to the perspective from which the image 620A was captured. For example, referring again to FIG. 6, the X-ray scanner 620 is aligned to capture images of a proximal face of the container 60, along an axis transverse to the axis of movement of the container 60 along the conveyor 680. Therefore, as is also shown in FIG. 6, the image 620A is projected upon the proximal face based at least in part on a position and/or an orientation of the container 60, as determined by the imaging device 622, such that the image 620A permits workers or other personnel to effectively peer into the container 60 and evaluate the contents thereof without opening the container 60.

Although the system 600 of FIG. 6 is configured to capture and project a single X-ray image onto one exterior surface of the container 60, those of ordinary skill in the pertinent arts would recognize that the systems and methods of the present disclosure are not so limited. Any number of X-ray scanners 620 may be provided and configured to capture any number of X-ray images 620A of the container 60. Likewise, any number of projectors 624 may be provided for projecting such images onto any number of surfaces of the container 60. Moreover, although the container 60 of FIG. 6 is in the form of a rectangular solid, the systems and methods of the present disclosure are also not so limited, and any form or shape of container (e.g., cylindrical, pyramidal, spherical) may be utilized in accordance with such systems and methods.

Figure 7:
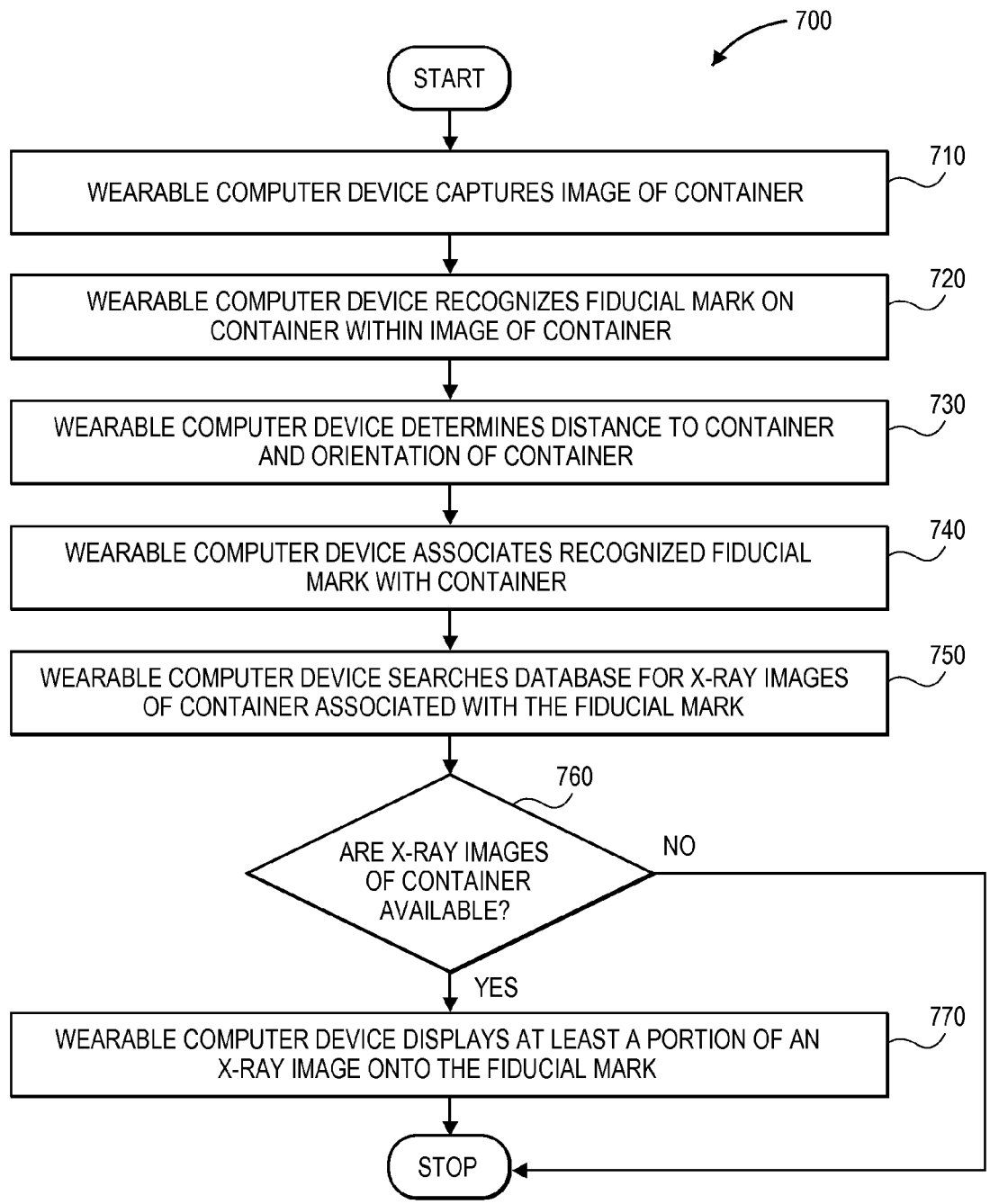
FIG. 7 is a flow chart of one process for evaluating shipments using X-ray imaging, in accordance with embodiments of the present disclosure.

As is further discussed above, an X-ray image of the contents of a container may be rendered onto one or more eye-level displays of a wearable computer device or imaging system, such as the augmented reality glasses 140 of FIG. 1D. The wearable computer device or imaging system may be adapted or configured to receive an X-ray image of the container and to cause the image to be rendered when the container is within a field of view of the device, such as on a specific surface of the container. Referring to FIG. 7, a flow chart 700 representing one embodiment of a process for evaluating shipments using X-ray imaging is shown. At box 710, a wearable computer device captures at least one image of a container, and at box 720, the wearable computer device recognizes at least one fiducial mark on the container within the image. For example, an image may be captured of the container 10 of FIG. 1A, using the imaging device 150 on the glasses 140, which may be an RGB-Z image sensor, and the glasses 140 may recognize one or more of the fiducial marks 18A, 18B within the image.

At box 730, the wearable computer device determines a distance to the container and an orientation of the container. For example, where the wearable computer device includes an RGB-Z image sensor, the wearable computer device may perform one or more visual analyses of an X-ray image in order to recognize the edges, contours or outlines of the container within the X-ray image, and detect a distance to the container, as well as an orientation, e.g., using one or more infrared, laser or other automatic range-finding systems or components.

At box 740, the wearable computer device associates the recognized fiducial mark with the container. For example, the wearable computer device may identify the fiducial mark and search a registry, ledger, index or other list of information regarding a plurality of containers based on the fiducial mark. At box 750, the wearable computer device searches a database for one or more X-ray images of the container that has been associated with the fiducial mark. Such X-ray images may have been captured of one or more aspects of the container using one or more X-ray scanners, such as the X-ray scanner 620 of FIG. 6, while the container is stationary or in motion, such as the conveyor 60 on the conveyor 680 of FIG. 6, and stored in at least one data store. Subsequently, upon the association of the fiducial mark at box 730, one or more of the X-ray images may be identified in the database, which may be located remotely from the wearable computer device.

At box 760, the wearable computer device determines whether one or more X-ray images of the container are available in the database. If no X-ray images of the container are available within the database, then the process ends. If any X-ray images are available within the database, however, the process advances to box 770, where at least a portion of the X-ray image is rendered onto or in alignment with the fiducial mark recognized at box 740, and the process ends. The wearable computer device may be configured to render the X-ray image in a manner consistent with the distance to and the orientation of the container onto the same fiducial mark that was recognized at box 760 when the container is within a field of view of the wearable computer device, e.g., the glasses 140 of FIG. 1D. Alternatively, the wearable computer device may be configured to render the X-ray image onto any form of fiducial mark, which may be any form of sufficiently textured two-dimensional marking on an exterior surface of the container.

Figure 8A:
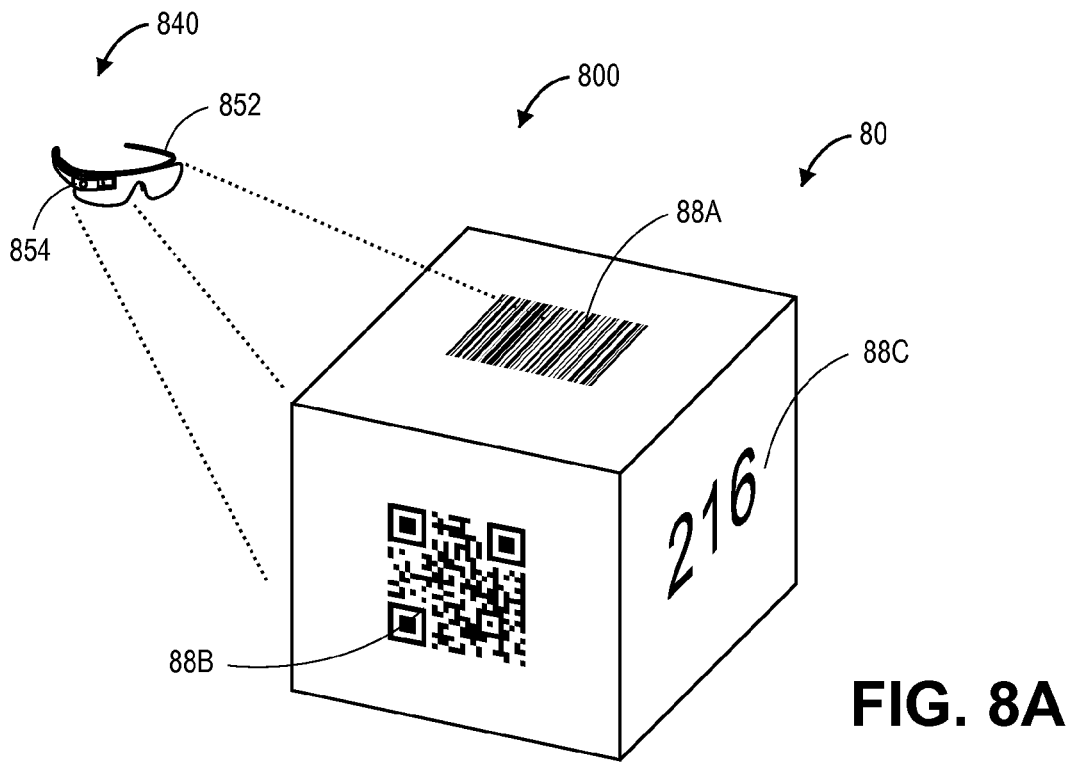
FIGS. 8A and 8B show components of one system for evaluating shipments using X-ray imaging, in accordance with embodiments of the present disclosure.
Figure 8B:
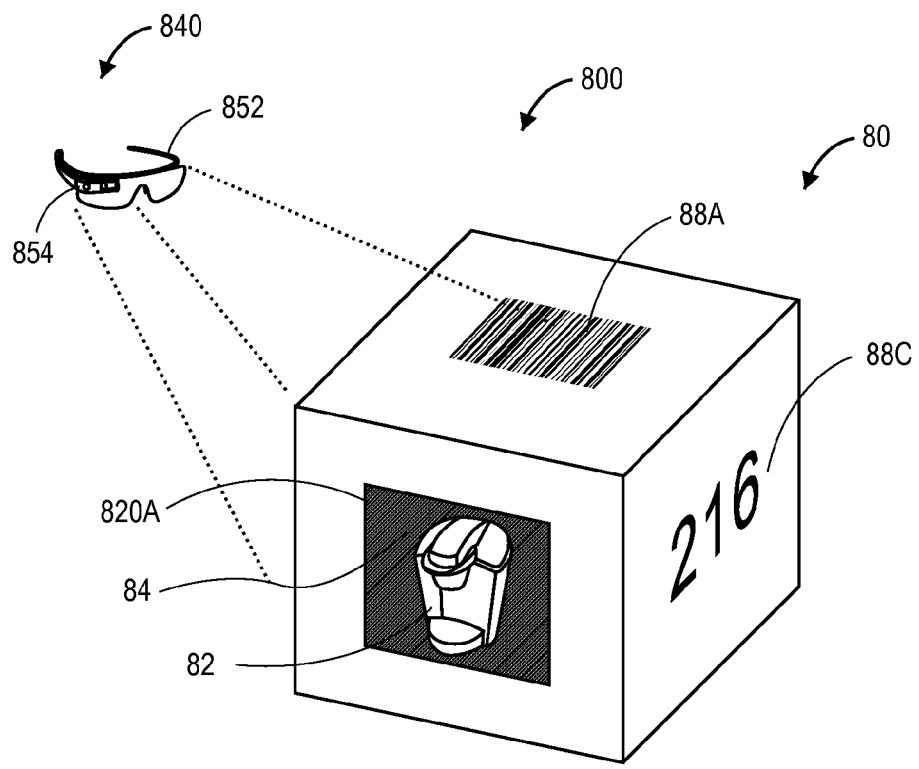

The rendering of X-ray images onto an object viewed using a wearable computer device, such as augmented reality glasses, is shown with regard to FIGS. 8A and 8B.

Referring to FIGS. 8A and 8B, components of one system 800 for evaluating shipments using X-ray imaging are shown. Except where otherwise noted, reference numerals preceded by the number "8" in FIG. 8A or FIG. 8B indicate components or features that are similar to components or features having reference numerals preceded by the number "6" shown in FIG. 6, to components or features having reference numerals preceded by the number "4" shown in FIG. 4, to components or features having reference numerals preceded by the number "2" shown in FIG. 2, or to components or features having reference numerals preceded by the number "1" shown in FIG. 1.

As is shown in FIG. 8A, the system 800 includes a wearable computer device 840, e.g., augmented reality glasses, having a sensor 852 and an imaging device 854. The sensor 852 may be any form of sensor 626 may be configured to recognize one or more markings 88A, 88B, 88C on an external surface of the container 60. The imaging device 854 may be configured to capture one or more photographic images of the container 80, or to sense or determine information regarding an orientation or position of the container 80.

According to some systems and methods of the present disclosure, such as the process for evaluating shipments using X-ray imaging represented in the flow chart 700 of FIG. 7, the system 800 of FIG. 8A may be configured to identify the container 80, such as by interpreting one or more of the markings thereon 88A, 88B, 88C, and to render one or more X-ray images onto a surface of the container 80 when the container 80 is placed within a field of view of the wearable computer device 840. Referring to FIG. 8B, the container 80 is shown with an X-ray image 820A of the contents of the container 80 rendered thereon. Thus, when the wearable computer device 840 recognizes the container 80 and the marking 88B, the wearable computer device 840 may access one or more X-ray images of the container 80, and render one of the X-ray images 820A onto the marking 88B when the container 80 is within its field of view.

Figure 9A:
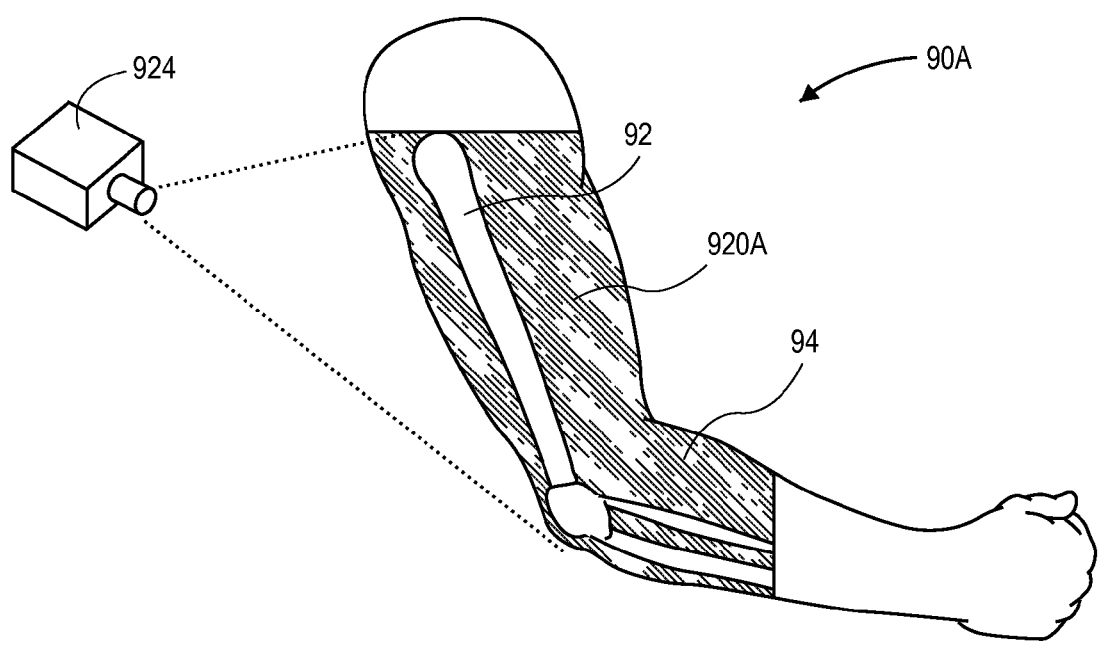
FIGS. 9A and 9B show images projected by one system for evaluating shipments using X-ray imaging, in accordance with embodiments of the present disclosure.
Figure 9B:
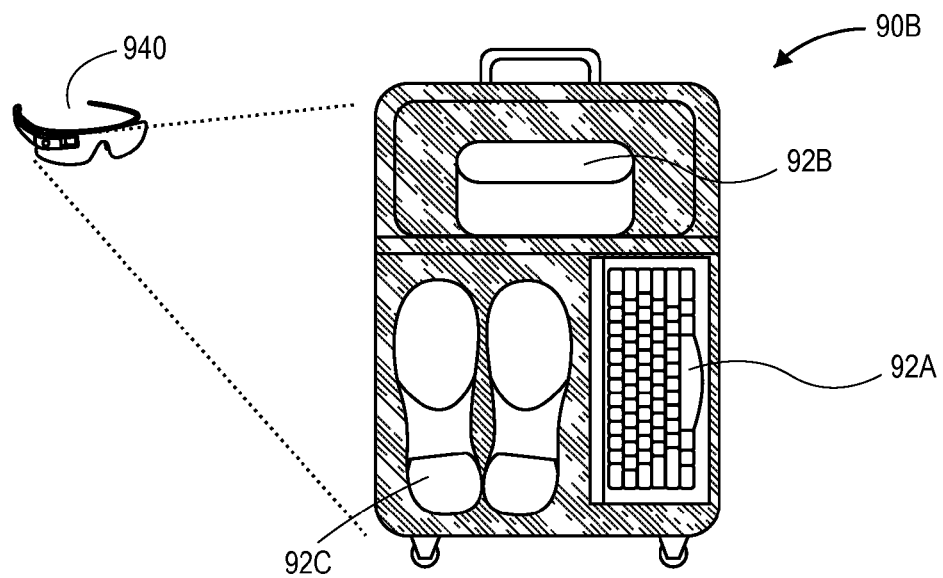

Although the disclosure has been described herein using exemplary techniques, components, and/or processes for implementing the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure. For example, although many of the embodiments described herein or shown in the accompanying figures are described for use in a fulfillment center environment, the systems and methods are not so limited, and may be employed in any environment, such as in accordance with one or more medical procedures or security protocols. Referring to FIGS. 9A and 9B, images projected by one system for evaluating shipments using X-ray imaging, in accordance with embodiments of the present disclosure are shown. Except where otherwise noted, reference numerals preceded by the number "9" in FIG. 9A or FIG. 9B indicate components or features that are similar to components or features having reference numerals preceded by the number "8" shown in FIG. 8A or FIG. 8B, to components or features having reference numerals preceded by the number "6" shown in FIG. 6, to components or features having reference numerals preceded by the number "4" shown in FIG. 4, to components or features having reference numerals preceded by the number "2" shown in FIG. 2, or to components or features having reference numerals preceded by the number "1" shown in FIG. 1.

As is shown in FIG. 9A, a projector 924 is configured to project one or more X-ray images 920A onto a human arm 90A including bone matter 92 and muscle or tissue matter 94. Therefore, when a doctor or other medical staff member views the human arm 90A, the doctor or staff member may view the X-ray image 920A directly upon the human arm 90A, and need not open a file or conduct exploratory surgery to determine the portions of the human arm 90A corresponding to bones 92, and the portions of the human arm 90A corresponding to muscle or tissue matter 94.

As is shown in FIG. 9B, a pair of augmented reality glasses 940 includes a suitcase 90B within its field of view. The glasses 940 are configured to recognize the container 90B and to render an X-ray image 920B of the contents of the suitcase 90B, viz., a computer 92A, a toiletry bag 92B and a pair of shoes 92C, onto an external surface of the suitcase 90B when the suitcase 90B is within a field of view of the glasses 940.

Additionally, although some of the embodiments disclosed herein refer to X-ray imaging, those of ordinary skill in the pertinent arts would recognize that the systems and methods are not so limited, and that radiographic imaging using electromagnetic radiation of any relevant wavelengths, frequencies or energy levels, or having any type or form of a wave pattern, may be utilized in accordance with the present disclosure. Moreover, images obtained by various other imaging techniques, including but not limited to ultrasonic images or magnetic resonance images, may also be utilized in accordance with the present disclosure.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow charts shown in FIGS. 3, 5 and 7, the order in which the boxes or steps of the methods or processes are listed is not intended to be construed as a limitation on the claimed inventions, and any number of the boxes or steps can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or boxes or steps. In a similar manner, terms such as "include," "including" and "includes" are generally intended to mean "including, but not limited to." Thus, such conditional language is not generally intended to imply that features, elements and/or boxes or steps are in any way required for one or more embodiments or that one or more embodiments necessarily include logic for deciding, with or without user input or prompting, whether these features, elements and/or boxes or steps are included or are to be performed in any particular embodiment.

Although the invention has been described and illustrated with respect to exemplary embodiments thereof, the foregoing and various other additions and omissions may be made therein and thereto without departing from the spirit and scope of the present disclosure.

What is claimed is:

1. A method for evaluating a shipment comprising:
    capturing digital imaging data of a portion of a container using an imaging device, wherein the container includes at least one item and the portion of the container comprises an external identifier;
    identifying the container based at least in part on the digital imaging data;
    capturing a radiographic image of the container using at least one radiographic scanning device;
    storing the radiographic image in association with the container in at least one data store;
    determining, as the container is in motion, a position of the container and an orientation of the container at a first time based at least in part on the digital imaging data;
    retrieving the radiographic image of the container from the at least one data store; and
    rendering, as the container is in motion, at least a portion of the radiographic image in alignment with the external identifier in an eye-level display of a wearable computer device in the position and in the orientation at the first time.

2. The method of claim 1, wherein the container is placed in motion using at least one conveying system.

3. The method of claim 1,
    wherein identifying the container based at least in part on the digital imaging data comprises:
    recognizing the at least one external identifier at the first time using at least one computer processor.

4. The method of claim 1, wherein the external identifier comprises at least one of:
    an image;
    a one-dimensional bar code;
    a two-dimensional bar code;
    a bokode;
    a text character;
    a number;
    a symbol; or
    a color.

5. The method of claim 1, further comprising:
    determining, as the container is in motion, a position of the container and an orientation of the container at a second time based at least in part on the digital imaging data; and
    rendering, as the container is in motion, at least the portion of the radiographic image in alignment with the external identifier in the eye-level display of the wearable computer device in the position and in the orientation at the second time.

6. The method of claim 1, wherein capturing the radiographic image of the container using at least one radiographic scanning device comprises:
    capturing a first radiographic image of the container using a first radiographic scanning device; and
    capturing a second radiographic image of the container using a second radiographic scanning device, and
    wherein rendering, as the container is in motion, at least the portion of the radiographic image in alignment with the external identifier in the eye-level display of the wearable computer device in the position and in the orientation at the first time comprises:
    rendering, as the container is in motion, the first radiographic image in alignment with the external identifier upon a first surface of the container at the first time; and
    rendering, as the container is in motion, the second radiographic image upon a second surface of the container at the first time.

7. A method comprising:
    identifying a container using at least one sensor, wherein the container comprises a marking on at least one exterior surface;
    capturing a radiographic image of the container using at least one radiographic scanning device;
    determining information regarding contents of the container based at least in part on the radiographic image using at least one computer processor;
    causing, as the container is in motion, a display of at least a portion of the radiographic image in alignment with the marking on the at least one exterior surface in an eye-level display within a field of view of a wearable computer device; and
    storing an association between the radiographic image and the container in at least one data store.

8. The method of claim 7,
    wherein the identifying the container using the at least one sensor comprises:
    reading the marking on the at least one exterior surface using the at least one sensor; and
    identifying the container based at least in part on the marking using the at least one computer processor.

9. The method of claim 7, further comprising:
    performing a visual analysis of the radiographic image using the at least one computer processor.

10. The method of claim 9, further comprising:
    identifying at least one of:
    a portion of the contents corresponding to an item;
    a portion of the contents corresponding to dunnage; or
    a portion of the contents corresponding to air,
    based at least in part on the visual analysis using the at least one computer processor.

11. The method of claim 9, further comprising:
    identifying at least one of an edge of an item, a contour of the item or an outline of the item based at least in part on the visual analysis using the at least one computer processor.

12. The method of claim 9, further comprising:
    determining a condition of the contents based at least in part on the visual analysis using the at least one computer processor.

13. The method of claim 9, further comprising:
    causing a display of at least a portion of the information on at least one of a computer display, the eye-level display of the wearable computer device, or a surface of the container using at least one projector.

14. The method of claim 8, wherein the reading the marking on the at least one exterior surface using the at least one sensor comprises:
    capturing digital imaging data regarding the container using the at least one sensor;
    determining, as the container is in motion, at least one of a position or an orientation of the container based at least in part on the digital imaging data; and
    operating the eye-level display of the wearable computer device based at least in part on the position or the orientation.

15. A wearable imaging system comprising:
    a sensor device mounted to a frame;
    a display device mounted to the frame; and a computing device in communication with at least one of the sensor device or the display device,
wherein the computing device is configured to at least:
- capture information regarding an object using the sensor device;
- identify a radiographic image associated with the object based at least in part on the captured information;
- recognize a fiducial mark on a surface of the object; and
- cause, as the object is in motion, a display of at least a portion of the radiographic image in alignment with the fiducial mark by the display device responsive to the object being within a field of view of the wearable imaging system.

16. The wearable imaging system of claim 15, wherein the computing device is further configured to:
- determine, as the object is in motion, a position of the object based at least in part on the information regarding the object; and
- determine, as the object is in motion, an orientation of the object based at least in part on the information regarding the object,
- wherein at least the portion of the radiographic image is rendered in alignment with the fiducial mark within the field of view of the wearable imaging system based at least in part on the position or the orientation.

17. The wearable imaging system of claim 15, wherein the object is one of a container having at least one item included therein or a portion of a human body.

* * * * *